United States Patent [19]
Rilett

[11] 3,766,518
[45] Oct. 16, 1973

[54] APPARATUS FOR DETERMINING DISTANCE

[75] Inventor: John W. Rilett, Saffron Walden, England

[73] Assignee: Maurice Powell Limited, Walden, England

[22] Filed: Dec. 15, 1969

[21] Appl. No.: 884,893

[30] Foreign Application Priority Data
Dec. 18, 1968 Great Britain................... 60,196/68

[52] U.S. Cl................................ 340/3 R, 343/7 TA
[51] Int. Cl................................................ G01s 9/68
[58] Field of Search .................... 340/1, 3; 343/7 A, 343/7 TA, 112 CA, 13

[56] References Cited
UNITED STATES PATENTS

| | | | |
|---|---|---|---|
| 2,009,459 | 7/1935 | Turner.................................... | 340/3 |
| 3,210,760 | 10/1965 | Olson et al. ....................... | 343/7 TA |
| 2,403,527 | 7/1946 | Hershberger........................ | 340/1 X |
| 2,998,591 | 8/1961 | Lovett.................................... | 340/1 |
| 3,179,939 | 4/1965 | Castellini............................. | 343/112 |

Primary Examiner—Richard A. Farley
Attorney—Sughrue, Rothwell, Mion, Zinn and Macpeak

[57] ABSTRACT

An electronic apparatus for depth sounding and range finding and primarily intended for use with ships. The apparatus produces an analogue voltage indicative of distance and proportional to the time duration between the transmission of pulses of acoustic energy and the reception of corresponding reflection pulses and includes circuitry for producing warning signals if the analogue voltage reaches a pre-set value indicative of a certain distance or if the rate of change of the analogue voltage is predictable as producing a future value indicative of a certain distance within a pre-set time interval. Further circuitry is provided to improve the validity of the operational results of the apparatus.

14 Claims, 6 Drawing Figures

APPARATUS FOR DETERMINING DISTANCE

BACKGROUND OF THE INVENTION

The present invention relates to a method of, and an apparatus, for measuring the distance from one point to an object by means of wave propagation.

A common method of measuring distance is to transmit a short pulse of energy, which may be acoustic (i.e. a pressure wave) or electromagnetic so that the propagated wave will travel to the object, the distance of which is to be measured. The wave will be reflected by the object and the reflected wave is then received. By knowing the velocity of the wave in the medium concerned, and by measuring the time taken for the wave to travel to the object and back, the distance of the object may be calculated. Examples using this known technique are radar, radio altimeters, laser rangefinders, and sonar systems.

An apparatus utilizing this known method usually aims to merely give the user an indication of the distance from the object which can be a surface. In certain application such as with aircraft, ships or land vehicles it is desirable to give a user further information more particularly a warning when the distance decreases below a set level, and/or a warning when the rate of decrease of distance might result in collision within a pre-selected time period.

A general object of this invention is to provide a method and apparatus capable of providing this extra information.

SUMMARY OF THE INVENTION

According to one aspect of the invention there is provided a method of determining distance, comprising transmitting pulses of energy, receiving said pulses when reflected by an object, ascertaining the time duration between the transmission of said pulses and the reception of the corresponding reflection, producing an electrical signal indicative of distance and producing a warning signal when said electrical signal reaches a pre-selected value.

Further according to the invention a prediction signal is produced when the rate of change of said electrical signal is indicative of a pre-determined distance being reached within a pre-selected time interval.

According to another aspect of the invention there is provided means for transmitting pulses of energy, means for receiving said pulses when reflected from an object, means for continuously ascertaining the time duration between the transmission of said pulses and the reception of the corresponding reflections to thereby produce an electrical signal indicative of distance and means for producing a warning signal when said electrical signal reaches a pre-determined value.

The electrical signal is preferably an analogue voltage and preferably there is further provided means for producing a prediction signal when the rate of change of said analogue voltage is indicative of a pre-determined distance being reached within a pre-selected time interval.

The invention also aims to improve the validity of the distance-measuring technique in two ways: firstly, by preventing a temporary loss of the reflected pulses from resulting in erratic operation, and secondly, by reducing the susceptibility of the apparatus to spurious signals caused by interference or objects in the echo path.

The invention is particularly, but not solely, directed to a sonar depth-indicating system for use in small ships and power boats. In this application a conventional ultrasonic link is used, both the transmitter and receiver being mounted on the underwater portion of the ship or boat, and directing the transmitted pulses either slightly forwards and downwards or directly downwards from the ship or boat.

A normal transmission and reception system is used in which short bursts of acoustic energy are transmitted into the water at regular time intervals, these intervals being set by means of a depth range control.

The invention may be understood more readily, and various other features of the invention may become more apparent, from consideration of the following description.

BRIEF DESCRIPTION OF DRAWINGS

A constructional embodiment of an apparatus for use in depth-sounding with boats will now be described, by way of example only, and with reference to the accompanying drawings, wherein.

DESCRIPTION OF PREFERRED EMBODIMENT

Figure 1:
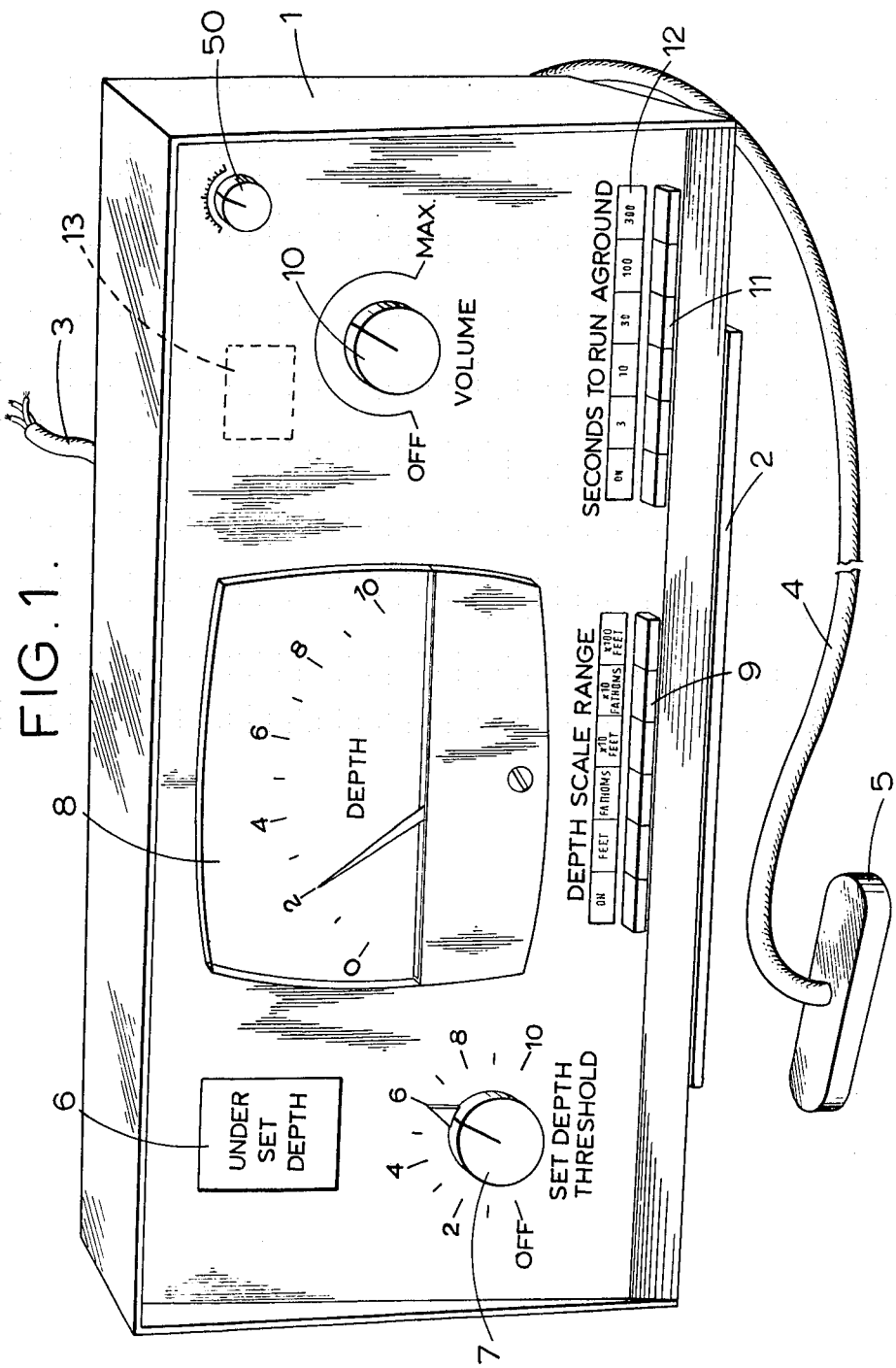
FIG. 1 is a perspective view of the outer parts of the apparatus as seen by a user.

As shown in FIG. 1 the external features of the apparatus consist of a main housing or case 1 preferably rotatably carried on a base member 2 with an electrical power input lead 3 and a cable 4 connectible to a transmitter/receiver transducer head 5 which is intended for mounting on the hull of a boat. The facia of the case 1 is provided with a window 6 which can be selectively illuminated to give a visual warning simultaneously with an audible warning produced by a loudspeaker 13 disposed within the case 1. This warning is given when a depth, pre-selected by a user, is reached and to this end a manually-operable setting member 7 provided with a calibrated scale of depths is provided. A manually operable volume control member 10 is used to vary the volume of the audible signal produced by the loudspeaker which signal may compose periodic "bleeps."

A main indicating instrument 8 in the form of a meter gives a visible indication of actual depth and its sensitivity, i.e. range, is controlled by a row of manually-depressible keys 9. A further row of manually-depressible keys 11 with a corresponding row of panels 12 is used to pre-set various time intervals as a basis for a further warning function. This warning function is concerned with a prediction in terms of time as to when a particular depth sounding, usually of zero depth, can be expected. When the pre-set time of prediction, set by depressing one of the keys 11, is reached the corresponding panels in the row of panels 12 is illuminated and a different audible tone, which again can consist of "bleeps," is delivered by the loudspeaker 13.

The transducer head 5 is preferably so mounted so that its direction may be varied, say through 90°. Thus the apparatus may be used to sound in depth, or to sound in range: the latter may be used for example in low visibility and if appropriate with a scale-switching facility to compensate for the dissimilar speeds of sound or other wave motion in water and in air, to "range" another vessel, a pierhead, or exposed land or rocks. By setting the transducer head 5 at a selected angle, a vector sounding may be read, which again may be useful in some circumstances for example if approaching a submerged vertical or steep ledge or rapidly-shoaling coastline.

The operation of the apparatus will become more apparent as the apparatus itself is described in more detail and in conjunction with FIGS. 2 to 6 of the accompanying drawings.

Figure 2:
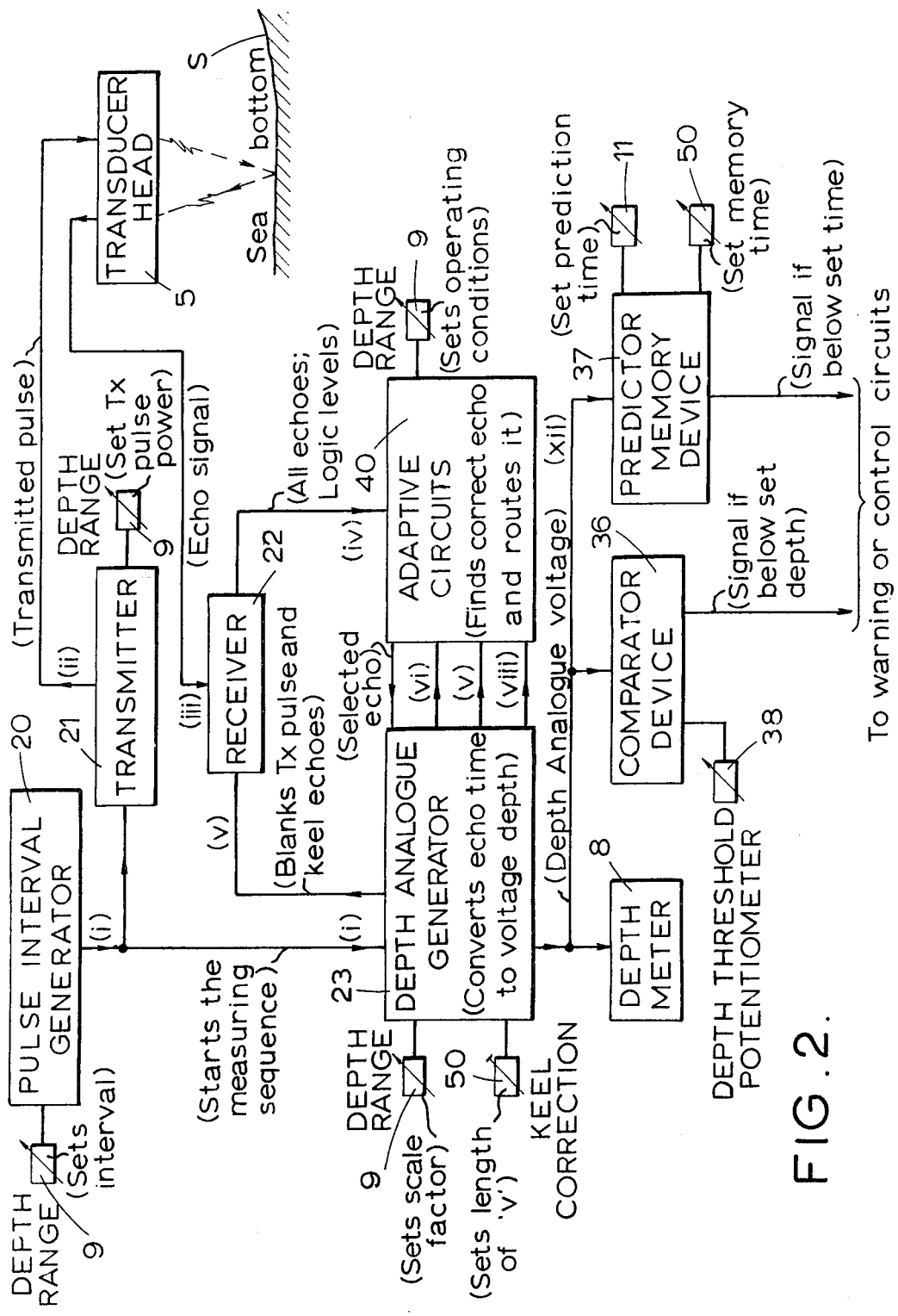
FIG. 2 is a block schematic diagram of the overall circuitry and components of the apparatus.
Figure 3:
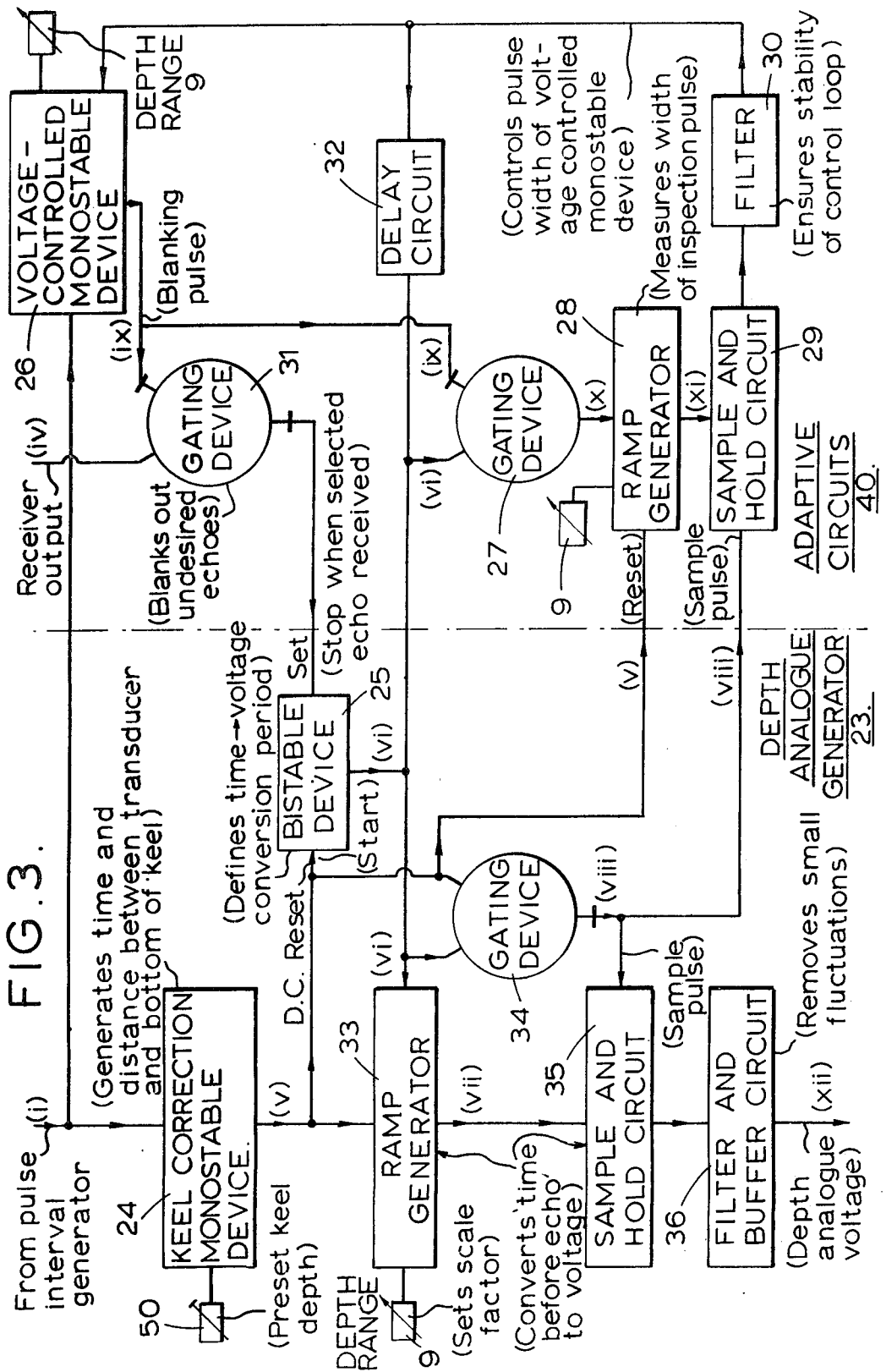
FIG. 3 is a block schematic diagram showing certain parts of the circuitry and components of the apparatus in greater detail.
Figure 4:
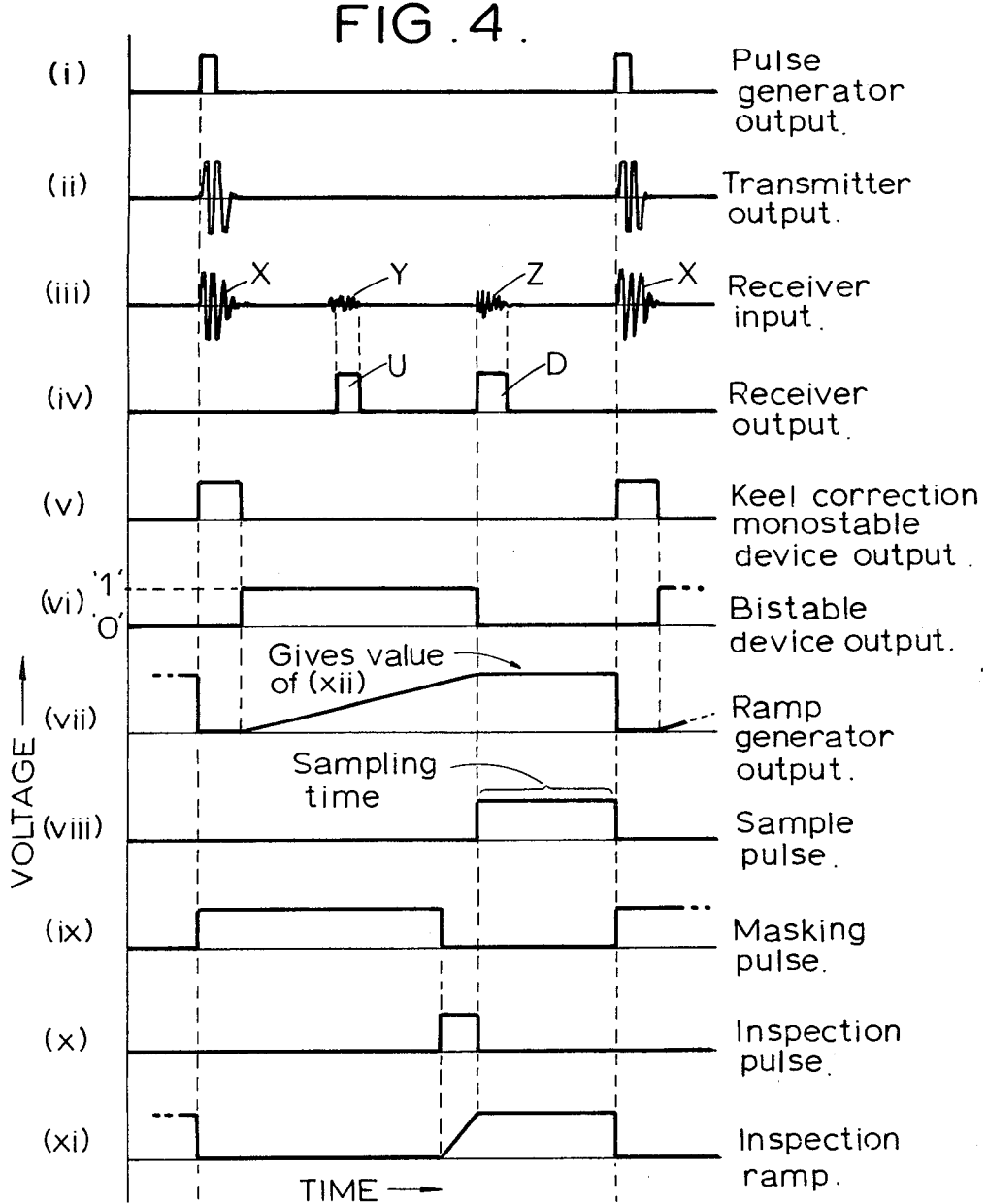
FIG. 4 is a graphical voltage/time representation of various waveforms (i) to (xi) arranged with identical time abscissae.

Referring to FIGS. 2 to 5 and initially to FIG. 2 a pulse generator 20 generates synchronized pulses, shown as waveform (i) in FIG. 4, the repetition rate of which pulses is determined by the selected key setting of the row of keys 9. This repetition rate will vary from about 200 pulses per second at depths less than 10 feet to about 2 pulses per second at depths in the order of 1,000 feet. These pulses, waveform (i) energize a transmitter 21 which produces pulses in the form of bursts of acoustic energy, shown as waveform (ii) in FIG. 4, at the pulse repetition rate of the waveform (i). The power of these acoustic pulses depends upon the setting on the range-selecting member 9. The acoustic pulses, waveform (ii) are delivered to the transducer head 5 and transmitted away from the boat's hull and generally downwards towards the sea-bed S. The transducer head 5 also serves to receive attenuated acoustic energy reflected from the sea-bed and any intervening objects, and the reflections are fed to a receiver 22 employing amplifying and filtering circuits and an a.g.c. system all known per se. The waveform (iii) in FIG. 4 shows a typical echo signal which can be received by the transducer head 5. This typical echo signal, waveform (iii), which is fed to a receiver 22 is depicted as being composed of transmitter breakthrough X a spurious unwanted echo Y and a steady echo Z from the sea-bed and representing the desired information. The receiver 22 is suitably controlled to eliminate the breakthrough X as will be described hereinafter and produces an output which is fed to a block referred to as adaptive circuits 40 the details of which are shown in FIG. 3. The output from the generator 20, waveform (i), is also fed to a block referred to as a depth analogue generator 23 the details of which are shown in FIG. 3.

As shown in FIG. 3 the depth analogue generator 23 includes a keel correction monostable device 24 which receives the waveform (i) and is energized by each of the pulses. The output of the monostable device 24 is shown as waveform (v) in FIG. 4 and is used to bias or delay the time-measuring circuitry, by means of a pre-set control 50 set by a user, to thereby enable the meter 8 to indicate the depth of the sea-bed from a point at some distance below the transducer head 5. Thus, for example, a yachtsman would normally have the transducer head 5 fitted to the hull of his yacht but could set the monostable device 24 by means of the control 50 so that the instrument 8 would actually indicate the depth between the bottom of the keel of his yacht and the sea-bed. In addition to this function, the output from the monostable device 24, waveform (v) is fed back to the receiver 22 to inhibit the receiver from operation for the duration of each pulse produced thereby and thus serves to blank out the transmitter breakthrough X. The remaining constituents Y and Z, waveform (iii), of the input to the receiver 22 are filtered therein and produce squared pulses of corresponding duration at the output of the receiver 22. The output waveform of the receiver 22 is shown as waveform (iv) in FIG. 4. The pulse D in the waveform (iv) corresponds to the desired echo signal Z whereas the pulse U in the waveform (iv) corresponds to the unwanted spurious signal Y which is eliminated by a masking pulse the generation of which is described hereinafter.

The trailing edge of each pulse from the device 24 is used to trigger a bi-stable device 25 into its "on" state, say its 1 state. The leading edge of the pulse D in the waveform (iv) normally serves to re-set the device 25 to its "off" state, i.e. in this case its 0 state and is subject to a gating operation described hereinafter. The output of the device 25 is shown as waveform (vi) in FIG. 4.

The output from the generator 20, waveform (i), is also fed to voltage-controlled monostable device 26 which produces an output shown as waveform (ix) in FIG. 4 referred to as the masking pulse. The duration between the lagging edge of each masking pulse, waveform (ix) and the lagging edge of the corresponding output pulse of the bi-stable device 25, waveform (vi), is used to produce an inspection pulse depicted as waveform (x) in FIG. 4. To this end the outputs from the devices 25, 26 are fed to a gating device 27. The output from the device 27, waveform (x), is fed to a ramp generator 28 which produces an output depicted as waveform (xi) in FIG. 4 and referred to as the inspection ramp. The voltage to which the ramp portion of the inspection ramp, waveform (xi), rises is directly proportional to the duration of the inspection pulse, waveform (x).

The output from the generator 28 is fed to a sample and hold circuit 29 which is adapted to store the output voltage of the generator 28 until caused to convey this voltage by the application of a sample pulse depicted as waveform (viii) in FIG. 4. The generation of the sample pulse will be described hereinafter.

The output from the circuit 29 is fed through a low-pass filter 30 to the device 26 and serves to ensure that an increase in the duration of the inspection pulse, waveform (x), produces a corresponding increase in the duration of the masking pulse, waveform (ix).

The output from the device 26, waveform (ix), is also fed to a further gating device 31 the output of which is connected to the re-set input of the bistable device 25. The gating device 31 serves to allow the waveform (iv) to re-set the device 25 except during the duration of the masking pulse, waveform (ix), when false echoes could inadvertently re-set the device 25.

A control voltage taken from the output of the filter 30 is applied to the voltage-controlled-monostable device 26 and may be made proportional to the time interval during which the bistable device 25 is in the 1 state, and therefore could be used as a voltage analogue of depth. However, it may be more convenient to generate the voltage analogue of depth separately, as will now be described.

The output from the device 25 wave (vi), is also fed to a delay circuit 32 a further gating device 34 and a further ramp generator 33. The ramp generator 33 is set by the output from the monostable device 24 and produces an output voltage, depicted as waveform (vii) in FIG. 4, proportional to the duration of the pulse produced at the output of the device 25, waveform (vi). The gating device 34 also receives the output from the device 24, waveform (v), and produces an output depicted in FIG. 4 as waveform (viii) and referred to as the sample pulse. The output from the ramp generator 33, waveform (vii), is fed to a further sample and hold circuit 35 which is adapted to store the maximum value of the output voltage of the generator 33 and which is controlled by the sample pulse produced at the output of the gating device 34, waveform (viii).

The gating device 34 ensures that the duration of the sample pulse, waveform (viii) is equal to the duration between the lagging edge of corresponding output pulse from the device 25, waveform (vi) and the leading edge of the next pulse from the device 24, waveform (v). For the duration of the sample pulse waveform (viii) both circuits 29, 35 are rendered operative to deliver the voltage stored thereby. The output from the circuit 35 is fed through a filter and buffer circuit 36 to provide part of a depth-indicative analogue voltage depicted in FIG. 5 as waveform (xii).

If the desired echo occurs much earlier than it occurred in a previous cycle it will be blocked by the masking pulse, waveform (ix), and the bistable device 25 will not be reset and thus no sampling pulse, waveform (viii) will be delivered to the delay circuit 32. If this occurs for more than a few cycles of operation, the delay circuit 32 will act effectively to short out the control voltage, from the filter 30, to the voltage-controlled-monostable device 26. This will cause the duration of the masking pulse to be reduced until the echo signal again passes through the gating device 31.

Occasionally, an echo may not be received at all due to a poor reflecting surface, or an interruption in the path of the acoustic beam. In this situation, the bistable device 25 will not be reset, and the sample-and-hold circuits 29, 35 will not transfer their respective voltages. In this event the voltage-controlled-monostable device 26 will continue to produce a masking pulse of the same duration as was produced before the echo disappeared and until the delay circuit 32 again comes into operation.

Should an echo not be received, no sample pulse will be produced (as explained previously), and so the "sample" part of the circuit 35 will not operate. As a result, the "hold" part of the circuit 35 will continue to store a voltage analogue of the depth measured when the last echo was received.

The waveform (xii) is fed to three items, namely:

The instrument or meter 8, a comparator device 36 (FIG. 2) and a predictor and memory device 37 (FIG. 2).

Figure 5:
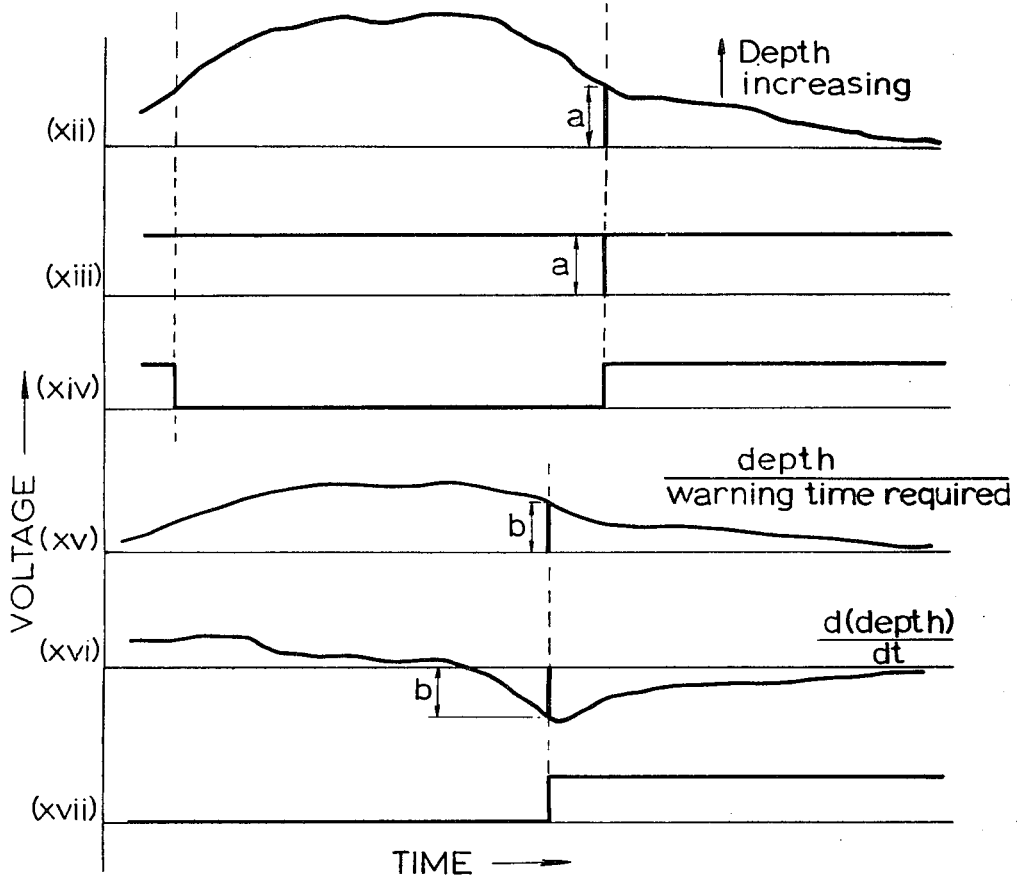
FIG. 5 is a further graphical voltage/time representation of various waveforms (xii) to (xvii) arranged with identical time abscissae.

The comparator device 36 is used to energize the visual and audible depth warnings referred to hereinbefore. The depth analogue voltage, waveform (xii) in FIG. 5 is compared continuously in the comparator device 36 with a voltage, depicted in FIG. 5 as waveform (xiii), set by the depth threshold potentiometer 38 (FIG. 2) controlled by the setting member 7 shown in FIG. 1. The reference *a* in waveforms (xii) and (xiii) denote equality. The voltage applied to the potentiometer 38 is made equal to the depth analogue voltage required to drive the meter 8 to full-scale deflection and the voltage taken from the potentiometer 38 to the comparator device 36 is proportional to the depth set in by the setting member 7, known as the "warning depth". When the depth analogue voltage becomes less than the voltage from the potentiometer 38, the comparator device 36 produces an output shown as waveform (xiv) in FIG. 5 which can be used to trigger the audible and visual warnings. As a further possibility the output could also be used to affect the driving controls of the boat, e.g. by reducing the engine throttle setting.

The predictor and memory device 37 provides a means of computing the function: (Actual Depth/Time of Warning Required) + Rate of change of depth with time If the value of this function becomes negative, an output is to be produced, which may be used to operate the aforementioned warning signal at the loudspeaker 13 and one panel in the row of panels 12. Under certain conditions it may be desirable to continuously compute the time to collision, and to display this on a suitable indicating device. However, in this embodiment of the invention, only the former alternative is employed as shown in FIG. 6.

Figure 6:
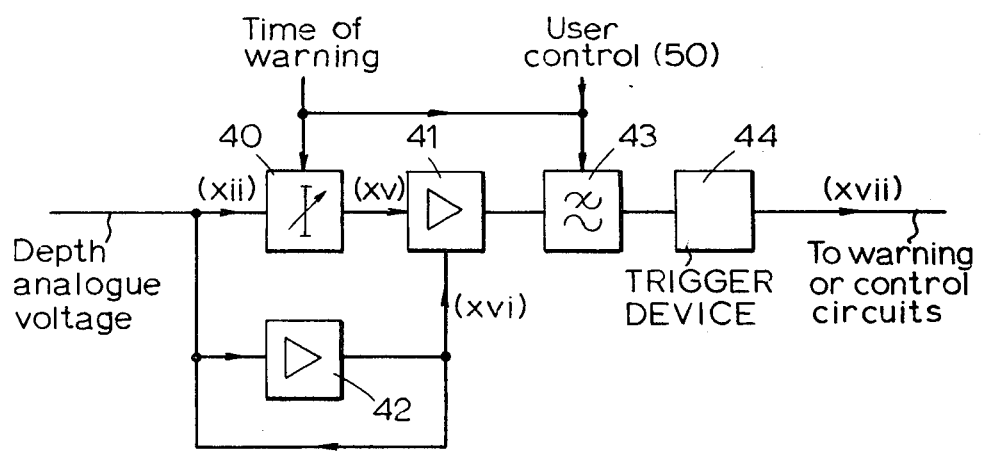
FIG. 6 is a block schematic diagram of the predictor and memory device of FIG. 2.

As shown in FIG. 6, the depth analogue voltage, waveform (xii) is attenuated by an attenuator 40 to obtain the first term of the above function, which is shown as waveform (xv) in FIG. 5. The degree of attenuation is determined by the time of warning selected by the user on the keys 11. The attenuated voltage, waveform (xv), is then added in an adding circuit 41 to a voltage which is a measure of the rate of change of the depth analogue voltage waveform (xii) with time and which is shown in FIG. 5 as waveform (xvi). The references *b* in waveforms (xv) and (xvi) denote equality. The differentiation function is accomplished by using a feedback amplifier 42 in the manner known per se. In order that the predictor device 37 may measure the overall slope of the sea bottom and not make premature predictions based on small sharp changes of slope, it is necessary to pass the summed voltage waveforms (xv) + (xvi) through a low-pass filter 43 to smooth out small fluctuations in voltage. The extent of the filtering is adjusted in two ways; firstly increasing the time of warning required is arranged to automatically increase the time constant of the filter 43 and secondly the user may control the time constant by means of an external control member 50.

After filtering the combined signal is fed to a trigger circuit 44 which gives an output when its input becomes negative. This signal, shown as waveform (xvii) may then be used to energize one of the panels in the row of panels 12 and possibly to trigger other warning or control circuits.

I claim:

1. In an apparatus for determining distance, said apparatus comprising means for transmitting successive pulses of energy, means for receiving said pulses when reflected from an object, means for continuously ascertaining the time duration between the transmission of said pulses and the reception of the corresponding reflections to produce an electrical analogue signal indicative of the distance between the apparatus and said object, and means for producing a warning signal when said electrical analogue signal reaches a predetermined value; the improvement comprising means for producing a prediction signal indicative of a predetermined distance being reached within a predetermined time interval by continuously assessing the rate of change of said electrical analogue signal.

2. An apparatus according to claim 1, wherein there is further provided means for varying the repetition rate of said transmitted pulses in accordance with preselectable ranges of distance and an instrument for indicating said electrical signal.

3. An apparatus according to claim 2, wherein a monostable device is provided to cause the indicating instrument to indicate the distance between the object and a point displaced from a transducer head serving to transmit and receive said pulses and to selectively inhibit the operation of said receiving means during the transmission of pulses, and wherein the monostable device produces a square-wave pulse of pre-set duration upon transmission of each of said pulses.

4. An apparatus according to claim 3, wherein the receiving means produces square-wave pulses indicative of echo reflection pulses and the means for ascertaining the said time duration at least includes a bi-stable device adapted to produce an output pulse triggered by the lagging edge of each pulse produced by said monostable device and re-set by the leading edge of a succeeding echo reflecting pulse produced by the receiving means and corresponding to said pulse produced by the monostable device.

5. An apparatus according to claim 3 and further comprising means for producing masking pulses each of which prevents indicative operation of the apparatus during its duration.

6. An apparatus according to claim 1 and further comprising means for producing masking pulses each of which prevents indicative operation of the apparatus during its duration.

7. An apparatus according to claim 5, wherein there is provided means for producing an inspection pulse the duration of which is equal to the duration between the lagging edge of one of said masking pulses and the lagging edge of the corresponding output pulse from said bi-stable device and wherein there is also provided means for determining the duration of each inspection pulse.

8. An apparatus according to claim 7, wherein the means for determining the duration of each inspection pulse is a ramp voltage generator, and a feed back loop extends between the ramp generator and said masking-pulse producing means, the feed back loop serving to apply a control voltage to said masking-pulse producing means.

9. An apparatus according to claim 8, wherein the ramp generator is connected to a sample and hold circuit adapted to store the maximum value of the output voltage of said ramp generator and there is provided means for producing a sample pulse the duration of which is equal to the duration between the lagging edge of the corresponding output pulse of said bi-stable device and the leading edge of the succeeding pulse from said monostable device, the sample pulse being produced only when the bistable device is reset by an echo reflection pulse and being conveyed to the sample and hold circuit to cause the latter to deliver the voltage stored thereby.

10. An apparatus according to claim 9, wherein the output from the sample and hold circuit produces said control voltage and a delay circuit is connected between said control voltage input of the masking-pulse producing means and the output of the bistable device, said delay circuit being selectively operable to short circuit the control voltage if several echo reflection pulses become blocked by said masking pulses.

11. An apparatus according to claim 1, wherein there is provided a potentiometer for setting a voltage corresponding to the value of said analogue voltage which would be indicative of a certain distance, and means for producing a warning signal includes a comparator adapted to indicate equivalence between the analogue voltage and the voltage set by said potentiometer.

12. An apparatus according to claim 1, wherein the means for producing a prediction signal is in the form of a computing device for continuously computing an estimated time before collision with the object from the rate of change of said electrical analogue signal and means for comparing the output from said device with a manually preselected time interval representing the time of warning desired.

13. An apparatus according to claim 12, wherein said computing device includes a differentiating circuit.

14. In an apparatus for determining distance, said apparatus comprising means for transmitting successive pulses of energy, means for receiving said pulses when reflected from an object, means for continuously ascertaining the time duration between the transmission of said pulses and the reception of the corresponding reflections to produce an electrical analogue signal indicative of the distance between the apparatus and said object, and means for producing a warning signal when said electrical analogue signal reaches a predetermined value; the improvement comprising means for producing a prediction signal by continuously assessing the rate of change of said electrical analogue signal, said prediction signal being indicative of a predetermined distance being reached within a predetermined time interval, and means for eliminating spurious echo reflections and for correcting for temporary loss of reflection pulses.

* * * * *